July 1, 1958 H. HEIMBERGER 2,841,764
DEVICE FOR TESTING ELECTRICAL APPARATUS
Filed Nov. 24, 1953
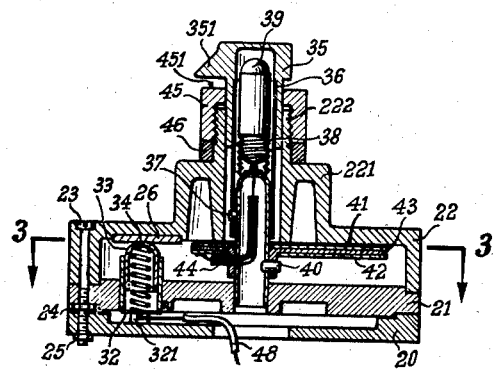
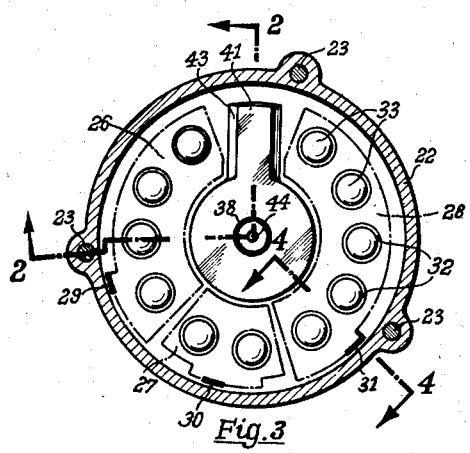
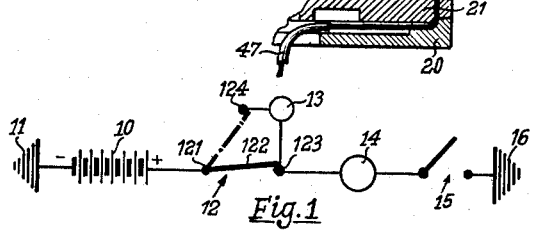
INVENTOR
HERMANN HEIMBERGER
ATTORNEYS United States Patent Office 2,841,764
Patented July 1, 1958

2,841,764

DEVICE FOR TESTING ELECTRICAL APPARATUS

Hermann Heimberger, Reutlingen, Germany

Application November 24, 1953, Serial No. 394,147

5 Claims. (Cl. 324—51)

My present invention relates to devices for testing electrical circuits and hence of electrical apparatus in such circuits, particularly those in automobiles.

It is a principal object of my invention to provide such a testing device which will obviate the drawbacks of the prior art devices which have been found to be complicated, expensive and unreliable in operation, especially when a sizable number of circuits are to be tested by the one device as obtains in automotive practice.

A still further object is to provide such a device in which any one of a plurality of circuits may be tested by the simple turning of a switch to a designated point, said device also being adapted to take care of circuits having different current sources as may be necessary when different voltages are used or where both alternating and direct current are used.

These and other important objects are accomplished according to the present invention by providing as part of my improved device means for conducting the current of the circuits to be tested, together with a signal device and a switching device electrically connected thereto, and means for electrically interposing said signal device in said circuit to be tested. Thereby, if current is flowing through the circuit to be tested, it will actuate said signal device.

For a more complete understanding of my invention, reference may now be had to the following description taken with the annexed drawings in which Fig. 1 shows the circuit diagram of a switching device explanatory of the invention;

Fig. 2 is a sectional view of an illustrative embodiment of the invention, such section being taken along line 2—2 of Fig. 3;

Fig. 3 is a section along line 3—3 of Fig. 2; and

Fig. 4 shows a partial section along line 4—4 of Fig. 3.

In the circuit diagram of Fig. 1, 10 indicates a source of current, in this case a battery, whose negative pole is grounded at 11 as by being connected to the frame of the automobile. The positive pole of the battery 10 is connected to the contact 121 of a switch 12, whose switching lever 122 may be moved so as to be electrically connected either with the contact 123 or with contact 124. There is connected in between the aforementioned contacts 123 and 124 a signal device, for example a testing lamp 13. From the contact 123 an electrical conductor runs to an electric incandescent lamp 14, for example the headlight of an automobile, whose correct functioning is to be ascertained by means of the improved testing device. An additional conductor runs from the aforementioned lamp 14 to a switch 15 which serves for switching the lamp 14 off and on. One pole of the switch 15 is connected at 16 with the grounded frame not shown.

In its normal operative position, the switch 12 is connected as is shown by the solid-line position of the switching arm 122, so that consequently, when the on-and-off switch 15 is closed, the electric incandescent lamp 14 is switched on and lights, provided that its electrical circuit is entirely in order. The electrical circuit of the test lamp 13 is interrupted when not in use so that this lamp is not lit. If it is desired to check whether the lamp 14 is glowing properly, the switching arm 122 is moved on its pivot into the position shown by dot-dash lines so that the electrical circuit is closed by way of contact 121, switch arm 122, test lamp 13 and contact 123. After checking the lamp 14, the switch arm 122 is brought back to its original position so that the test lamp 13 is again switched out and is no longer lit. By tests of this kind, all the current consumers of an electric installation can be checked whereby an individual testing installation can be provided for each current consumer, as is shown schematically in Fig. 1. It is, however, a feature of my present invention to provide a single switch and a single test lamp for several current consumers such that, as above pointed out, by actuating the switch the individual circuits are tested in succession. A switching device of this kind will now be described by reference to Figs. 2 to 4.

The switching device shown in these figures has a switch housing or case with a bottom 20, a contact carrier 21, and a cover 22, having a hollow flange 221 on which is disposed a screw threaded boss 222 which is likewise hollow. The different parts of the housing are held together by screws 23 and nuts 24 and 25. At the inner upper wall of the cover 22 are provided contact pieces 26, 27 and 28 whose shape is indicated by dot-dash lines in Fig. 3, and which will moreover be termed the first contact pieces. The aforementioned contact pieces are fixed to the cover 22 and may for example be cast in the cover. From the three contact pieces conductors 22, 30 and 31 run in the interior of the cover 22 through an opening in the contact carrier 21 and along below this contact carrier and terminate in the cables 47, as may be seen from Fig. 4. These cables run, for example, to the different sources of current that might be provided in an automobile, that is for example to a battery or to an alternating current source required for the blinking lamps.

In the contact carrier 21 are round recesses, eleven in the present case, in which are housed the so-called second contact pieces, preferably in the form of contact cartridges. These cartridges have shells 32 which are fixed to the contact carrier 21 and have slidable caps 33 beneath which are disposed coil springs 34 also housed by the shells 32 whereby springs 34 tend to force the two aforementioned parts, which are in telescopic relation, apart from one another in such a way that the caps 33 always tend to bear against the inner upper wall of the cover 22 when the switch is in the position of Fig. 2. At the bottom of the shells 32 are provided connector lugs 321, to each of which is soldered a conductor 48. The aforementioned conductors 48 run to the several apparatus which are to be tested.

In the housing provided by flange 221 and also by boss 222 is provided a switch knob 35, which if desired may be of transparent material and have an indicating pointer 351, and to it is fastened a sleeve 36 to which is attached by means of lug 37 a sleevelike lamp carrier 38 in such a way that it participates in the turning movement of the switch knob 35. A test lamp 39 is screwed into the test lamp carrier 38.

To the lower part of test lamp carrier 38 is fixed by means of pin 40 a switch arm consisting of an upper contact plate 41, a lower contact plate 42 and an insulating plate 43 disposed between them. A conductor 44 connects the lower contact plate 42 with the center pole of the test lamp carrier 38 whereas upper plate 41 is connected to the sleeve pole of the lamp carrier 38 as clearly shown in Fig. 2.

A cap nut 45 is screwed on the threaded boss 222 and an elastic washer 46 is disposed between the flange 221 and the cap nut 45 to obtain a good seal and to lock the parts in place. It is possible to provide numerals or other markings on the flat surface 451 of the cap nut 45 for the purpose of indicating the position in which the switch knob 35, and consequently the switching device, is set.

The mode of operation of the improved device is as follows:

In the position of the switching device which is shown in Figs. 2 to 4, the current flows for example from different current sources of an automobile through the cables 47, the lines 29, 30 and 31 respectively, to the contact pieces 26, 27 and 28, and from there by way of contact cartridges 32, 33 to the cables 48, and from there to the individual apparatus to be tested. In this position of the switching device, therefore, the test lamp 39 is switched out. Now if the switching arm is rotated so that it becomes inserted between the contact pieces 26, 27 or 28 and the contact cartridge 32, 33 under consideration, then the current flows through the line 31, the upper contact plate 41, the test lamp carrier 38, the test lamp 39, the line 44, the lower contact plate 42, the cap 33, the sleeve 32, to the line 48, and consequently to the particular apparatus to be tested. In this position, therefore for a certain contact cartridge that belongs to a certain apparatus, direct connection with the associated contact plate is broken, and the test lamp 39 is switched in between the contact cartridge and the corresponding contact plate in series with the apparatus that is to be checked. If the circuit for this apparatus is in order, the test lamp 39 lights up. By further rotating the switching arm, all several apparatus may be tested in sequence. In the embodiment of Figs. 2 to 4, the switch arm 43 is in effect a two pole switch whereas by connecting the sleeve 38 to the contact pieces 26, 27 and 28, the contact plate 41 may be omitted whereupon the switch arm 43 becomes in effect a single pole switch in accordance with the diagrammatic showing of Fig. 1.

I claim:

1. In an electrical testing device for determining the condition of a plurality of circuits and adapted to be placed in said circuits to be tested without interfering with the normal operation of same, said device comprising in combination conducting means for each circuit to be tested and adapted to carry the current of said circuits, a pair of contacts in each of said circuits, one of said contacts being spring pressed against the other, a rotary knife blade switch arm and means for manually rotating same, a pair of separated contacts carried by said arm, one on the upper and the other on the lower side thereof and respectively connected to the two poles of said signal device, said spring pressed contacts being concentrically arranged with respect to said switch arm and being separable by movement of said contact arm thereagainst and while so separated establishing a circuit through said contacts carried by said arm to said signal device.

2. The electrical testing device according to claim 1 in which said conducting means are grouped for connection to different current sources.

3. In an electrical testing device for determining the condition of a plurality of electrical circuits, and adapted to be placed in said circuits to be tested without interference with the normal operation thereof, said device comprising in combination, a turning knob carrying a signal light in a manner so as to display the same, a switch arm joined to said knob and rotatable therewith upon the turning of said knob, said switch arm having conducting means thereon connected to said signal light, conducting means in said electric testing device for transmitting the current of each of said circuits to be tested, a pair of spring-pressed separable contacts in each of said conducting means, the same being arranged in the path of said switch arm, whereby the turning of said knob will cause said switch arm to be interposed between any given pair of said spring-pressed, separable contacts, and thereby to connect said signal light in series with said given circuit through said separable contacts and the conducting means carried by said arm.

4. The device according to claim 3 in which said signal light is disposed within said knob which is of light-transmitting material.

5. The device according to claim 3 in which said separable contacts are contained within a housing and comprise a stationary contact carried by said housing and a contact consisting of a telescopic member spring-pressed against said first mentioned contact.

References Cited in the file of this patent

UNITED STATES PATENTS

| | | |
|---|---|---|
| 1,479,420 | Nenno | Jan. 1, 1924 |
| 2,254,347 | Blakesley | Sept. 2, 1941 |
| 2,623,099 | Wallace | Dec. 23, 1952 |

FOREIGN PATENTS

| | | |
|---|---|---|
| 172,024 | Austria | July 25, 1952 |
| 695,292 | Great Britain | Aug. 5, 1953 |